(12) United States Patent
Keller et al.

(10) Patent No.: US 9,674,750 B2
(45) Date of Patent: *Jun. 6, 2017

(54) HANDLING OF ACCESS CAPABILITY INFORMATION IN A MOBILE NETWORK

(71) Applicant: Telefonaktiebolaget LM Ericsson (publ), Stockholm (SE)

(72) Inventors: Ralf Keller, Würselen (DE); Peter Hedman, Helsingborg (SE); Fredrik Lindholm, Stockholm (SE); Magnus Olsson, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,910

(22) Filed: Aug. 1, 2016

(65) Prior Publication Data

US 2016/0345226 A1    Nov. 24, 2016

Related U.S. Application Data

(63) Continuation of application No. 15/046,663, filed on Feb. 18, 2016, now Pat. No. 9,432,897, which is a
(Continued)

(51) Int. Cl.
*H04W 36/14*    (2009.01)
*H04W 8/20*    (2009.01)
(Continued)

(52) U.S. Cl.
CPC ............ *H04W 36/14* (2013.01); *H04W 8/20* (2013.01); *H04W 48/08* (2013.01); *H04W 48/16* (2013.01);
(Continued)

(58) Field of Classification Search
CPC ........ H04W 48/18; H04W 60/04; H04W 8/20
(Continued)

(56) References Cited

U.S. PATENT DOCUMENTS

| | | | |
|---|---|---|---|
| 5,422,940 A * | 6/1995 | Endo | .................... H04Q 3/0016 379/221.09 |
| 6,222,829 B1 | 4/2001 | Karlsson et al. | |

(Continued)

FOREIGN PATENT DOCUMENTS

| | | |
|---|---|---|
| JP | 2001527337 A | 12/2001 |
| JP | 2002534874 A | 10/2002 |

(Continued)

OTHER PUBLICATIONS

3rd Generation Partnership Project. "Technical Specification Group Core Network and Terminals; Evolved Packet System (EPS); Mobility Management Entity (MME) and Serving GPRS Support Node (SGSN) Related Interfaces Based on Diameter Protocol (Release 8)." 3GPP TS 29.272 V8.3.0, pp. 1-70, Jun. 5, 2009.
(Continued)

*Primary Examiner* — Chi H Pham
*Assistant Examiner* — Robert Lopata
(74) *Attorney, Agent, or Firm* — Coats and Bennett, PLLC

(57) ABSTRACT

In a mobile network with a plurality of access networks, a control node controls access of a user equipment to that one of the access networks which is currently used by the user equipment. The control node determines an access capability of the user equipment in the access network. The access capability includes whether an IP Multimedia Subsystem (IMS) voice over Packet Switched (PS) session is supported. The control node provides an indication of the determined access capability to a Home Subscriber Server (HSS) associated with the user equipment. The indication may then be
(Continued)

retrieved from the HSS and used to control termination of a connection to the user equipment.

19 Claims, 10 Drawing Sheets

Related U.S. Application Data continuation of application No. 13/390,161, filed as application No. PCT/EP2010/058029 on Jun. 8, 2010, now Pat. No. 9,294,993.

(60) Provisional application No. 61/221,732, filed on Jun. 30, 2009.

(51) Int. Cl.
  *H04W 48/18* (2009.01)
  *H04W 80/04* (2009.01)
  *H04W 48/08* (2009.01)
  *H04W 48/16* (2009.01)
  *H04W 76/02* (2009.01)

(52) U.S. Cl.
  CPC .......... *H04W 48/18* (2013.01); *H04W 76/02* (2013.01); *H04W 80/04* (2013.01)

(58) Field of Classification Search
  USPC .............. 370/310, 328, 329, 331, 225, 216; 455/422.1, 432.1
  See application file for complete search history.

(56) References Cited

U.S. PATENT DOCUMENTS

| | | | | |
|---|---|---|---|---|
| 6,507,567 B1* | 1/2003 | Willars | ........... | H04W 76/04 370/321 |
| 6,594,241 B1* | 7/2003 | Malmlof | ........... | H04W 28/18 370/329 |
| 6,654,602 B1* | 11/2003 | Fye | ........... | H04M 3/42 455/414.1 |
| 7,283,495 B2* | 10/2007 | Lee | ........... | H04W 36/10 370/331 |
| 7,664,495 B1* | 2/2010 | Bonner | ........... | H04W 4/16 370/338 |
| 7,676,229 B2* | 3/2010 | Albina | ........... | H04M 7/123 455/445 |
| 7,869,393 B2* | 1/2011 | Maxwell | ........... | H04W 88/16 370/218 |
| 7,944,896 B1* | 5/2011 | Rawat | ........... | H04W 4/10 370/338 |
| 7,990,875 B2* | 8/2011 | Massiera | ........... | H04W 36/30 370/234 |
| 8,107,951 B2* | 1/2012 | Wallentin | ........... | H04W 76/062 370/328 |
| 8,160,068 B2* | 4/2012 | Pfeffer | ........... | H04L 12/2801 370/235 |
| 8,219,087 B2* | 7/2012 | Tu | ........... | H04L 67/14 455/414.1 |
| 8,254,886 B2* | 8/2012 | Salkini | ........... | H04L 63/10 455/411 |
| 8,270,418 B2* | 9/2012 | Vikberg | ........... | H04L 63/10 370/401 |
| 8,351,420 B2* | 1/2013 | Linkola | ........... | H04M 7/0084 370/242 |
| 8,483,166 B2* | 7/2013 | Guo | ........... | H04W 8/26 370/329 |
| 8,532,089 B2* | 9/2013 | Dalrymple | ........... | H04L 12/66 370/352 |
| 8,548,518 B2* | 10/2013 | Krco | ........... | H04W 8/08 455/418 |
| 8,667,150 B2* | 3/2014 | Ku | ........... | H04L 65/1069 370/352 |
| 9,167,505 B2* | 10/2015 | Gupta | ........... | H04L 63/104 |
| 9,480,011 B2* | 10/2016 | Russell | ........... | H04W 48/18 |
| 2001/0049790 A1* | 12/2001 | Faccin | ........... | H04L 63/104 713/185 |
| 2004/0157600 A1* | 8/2004 | Stumpert | ........... | H04W 36/10 455/432.1 |
| 2005/0238051 A1* | 10/2005 | Yi | ........... | H04L 1/189 370/469 |
| 2007/0220005 A1* | 9/2007 | Castro Castro | ........... | H04W 4/08 |
| 2008/0102815 A1* | 5/2008 | Sengupta | ........... | H04W 36/24 455/424 |
| 2008/0130662 A1* | 6/2008 | Kotulla | ........... | H04L 29/06027 370/401 |
| 2008/0188223 A1* | 8/2008 | Vesterinen | ........... | H04W 36/02 455/436 |
| 2008/0249782 A1* | 10/2008 | Ativanichayaphong | | H04L 29/08072 704/275 |
| 2008/0256220 A1* | 10/2008 | Bachmann | ........... | H04W 8/04 709/222 |
| 2008/0305799 A1* | 12/2008 | Zuniga | ........... | H04W 36/0072 455/437 |
| 2008/0317000 A1* | 12/2008 | Jackson | ........... | H04L 65/1016 370/352 |
| 2009/0017823 A1* | 1/2009 | Sachs | ........... | H04W 36/14 455/437 |
| 2009/0094680 A1* | 4/2009 | Gupta | ........... | H04L 63/104 726/3 |
| 2009/0109924 A1* | 4/2009 | Sato | ........... | H04W 36/0055 370/331 |
| 2009/0219843 A1* | 9/2009 | Chin | ........... | H04W 36/0022 370/310 |
| 2009/0221304 A1* | 9/2009 | Pudney | ........... | H04W 68/00 455/458 |
| 2010/0061337 A1* | 3/2010 | Hallenstal | ........... | H04W 48/20 370/331 |
| 2010/0112980 A1* | 5/2010 | Horn | ........... | H04W 48/20 455/411 |
| 2010/0113010 A1* | 5/2010 | Tenny | ........... | H04L 12/66 455/423 |
| 2010/0124223 A1* | 5/2010 | Gibbs | ........... | H04W 28/06 370/389 |
| 2010/0203865 A1* | 8/2010 | Horn | ........... | H04W 48/16 455/411 |
| 2010/0208634 A1* | 8/2010 | Eng | ........... | H04L 45/00 370/310 |
| 2010/0208725 A1* | 8/2010 | Lahtinen | ........... | H04W 8/06 370/352 |
| 2010/0234029 A1* | 9/2010 | Ishii | ........... | H04W 36/0066 455/437 |
| 2010/0234042 A1* | 9/2010 | Chan | ........... | H04W 36/0061 455/453 |
| 2010/0284333 A1* | 11/2010 | Shirota | ........... | H04W 36/0022 370/328 |
| 2010/0284365 A1* | 11/2010 | Sundell | ........... | H04W 36/0066 370/331 |
| 2010/0323727 A1* | 12/2010 | Russell | ........... | H04W 36/385 455/466 |
| 2011/0013597 A1* | 1/2011 | Hwang | ........... | H04W 8/12 370/331 |
| 2011/0096688 A1* | 4/2011 | Sachs | ........... | H04W 48/18 370/252 |
| 2011/0110326 A1* | 5/2011 | Rexhepi | ........... | H04W 36/0022 370/331 |
| 2011/0143808 A1* | 6/2011 | Krco | ........... | H04W 8/08 455/525 |
| 2011/0200011 A1* | 8/2011 | Rune | ........... | H04W 36/0022 370/331 |
| 2011/0201337 A1* | 8/2011 | Forsberg | ........... | H04L 63/062 455/436 |
| 2011/0230162 A1* | 9/2011 | Mutikainen | ........... | H04W 4/22 455/404.1 |
| 2011/0274090 A1* | 11/2011 | Hallensal | ........... | H04W 36/0022 370/331 |
| 2011/0306321 A1* | 12/2011 | Keller | ........... | H04W 48/18 455/411 |

(56) References Cited

U.S. PATENT DOCUMENTS

| | | | | |
|---|---|---|---|---|
| 2011/0306344 | A1* | 12/2011 | Chen | H04W 36/0066 455/436 |
| 2012/0020347 | A1* | 1/2012 | De Vega De La Red | H04W 8/12 370/338 |
| 2012/0040667 | A1* | 2/2012 | Foresti | H04L 12/14 455/433 |
| 2012/0064873 | A1* | 3/2012 | Farnsworth | H04W 24/10 455/418 |
| 2012/0083277 | A1 | 4/2012 | Ishii et al. | |
| 2012/0087345 | A1* | 4/2012 | Yan | H04L 12/4633 370/331 |
| 2012/0093054 | A1* | 4/2012 | Liu | H04L 51/26 370/312 |
| 2013/0029630 | A1* | 1/2013 | Salkini | H04L 63/10 455/404.1 |
| 2013/0250032 | A1* | 9/2013 | Andre-Jonsson | H04W 36/0022 348/14.02 |
| 2014/0241246 | A1* | 8/2014 | Chin | H04W 36/0022 370/328 |

FOREIGN PATENT DOCUMENTS

| | | | |
|---|---|---|---|
| WO | 0040053 | A1 | 7/2000 |
| WO | 03088579 | A1 | 10/2003 |
| WO | 2009031659 | A1 | 3/2009 |

OTHER PUBLICATIONS

Motorola. "Registering Terminal's CSI Capability." 3GPP TSG SA WG2 Architecture—S2#46, S2-051325, May 9-13, 2005, Athens, Greece, pp. 1-2.

Rosenberg, J. et al. "Indicating User Agent Capabilities in the Session Initiation Protocol (SIP)." IETF Standard, Internet Engineering Task Force, Aug. 1, 2004, pp. 1-38.

Rosenberg, J. et al. "SIP: Session Initiation Protocol." IETF Standard, Internet Engineering Task Force, Chapter 10, Figure 2, Jun. 1, 2002, pp. 1-270.

3rd Generation Partnership Project. "Technical Specification Group Services and System Aspects; Architectural Requirements (Release 9)." 3GPP TS 23.221 V9.0.0, pp. 1-46, Sophia-Antipolis Cedex, France, Jun. 1, 2009.

3rd Generation Partnership Project. "Technical Specification Group Services and Architecture; IP Multimedia Subsystem (IMS) Service Continuity; Stage 2 (Release 9)." 3GPP TS 23.237 V9.1.0, pp. 1-88, Jun. 8, 2009.

NTT Docomo, Inc. "CS/PS mode of operation." 3GPP TSG-RAN WG2 #66, Tdoc-R2-093270, San Francisco, US, May 4-8, 2009, pp. 1-4.

3rd Generation Partnership Project, "3rd Generation Partnership Project; Technical Specification Group Services and System Aspects; Single Radio Voice Call Continuity (SRVCC), Stage 2 (Release 8)", Technical Specification, 3GPP TS 23.216, Version 8.4.0, Jun. 2009, pp. 1-35, France.

3rd Generation Partnership Project, "3rd Generation Partnership Project; Technical Specification Group Services and System Aspects; Circuit Switched Fallback in Evolved Packet System, Stage 2 (Release 8)", Technical Specification, 3GPP TS 23.272, Version 8.4.0, Jun. 2009, pp. 1-48, France.

3rd Generation Partnership Project, "3rd Generation Partnership Project; Technical Specification Group Services and System Aspects; IP Multimedia Subsystem (IMS) Centralized Services, Stage 2 (Release 8)", Technical Specification, 3GPP TS 23.292, Version 8.4.0, Jun. 2009, pp. 1-71, France.

3rd Generation Partnership Project, "3rd Generation Partnership Project; Technical Specification Group Services and Architecture; IP Multimedia Subsystem (IMS) Service Continuity, Stage 2 (Release 8)", Technical Specification, 3GPP TS 23.237, Version 8.4.0, Jun. 2009, pp. 1-40, France.

3rd Generation Partnership Project, "3rd Generation Partnership Project; Technical Specification Group Services and System Aspects; Study on Circuit Switched (CS) Domain Services over Evolved Packet Switched (PS) Access, Stage 2 (Release 9)", Technical Specification, 3GPP TS 23.879, Version 9.0.0, Mar. 2009, pp. 1-60, France.

Voice Over LTE Via Generic Access, "Voice Over LTE via Generic Access, Stage2 Specification; Phase 1", Technical Specification, V.o.L.G.A. Stage 2 Version 0.2.0, Apr. 29, 2009, pp. 1-74.

3rd Generation Partnership Project, "3rd Generation Partnership Project; Technical Specification Group Services and System Aspects; General Packet Radio Service (GPRS) enhancements for Evolved Universal Terrestrial Radio Access Network (E-UTRAN) access (Release 9)," Technical Specification, 3GPP TS 23.401, Version 9.1.0, Jun. 2009, pp. 1-234, France.

3rd Generation Partnership Project, "3rd Generation Partnership Project; Technical Specification Group Services and System Aspects; General Packet Radio Service (GPRS); Service description; Stage 2 (Release 9)," Technical Specification, 3GPP TS 23.060, Version 9.1.1, Jun. 2009, pp. 1-283, France.

Nokia Siemens Networks, "Introduction of Voice over IMS session support indication." 3GPP TSG CT WG1 Meeting.#58, C1-091634, Change Request, Sophia Antipolis, France, Apr. 20, 2009, pp. 1-5.

Nokia Siemens Networks, "Introduction of Voice over IMS session support indication." 3GPP TSG CT WG1 Meeting.#58, C1-091635, Change Request, Sophia Antipolis, France, Apr. 20, 2009, pp. 1-10.

* cited by examiner

| Termination in | CS | CS | LTE | CS | CS in case of SRVCC | CS in case of SRVCC |
|---|---|---|---|---|---|---|
| MSC attached | X | X | - | - | | |
| MSC-S registered | - | X | - | X | X | X |
| IMS registered by UE | - | - | X | X | X | X |
| T-ADS cases | ICS Fallback | MSC enhanced for ICS | LTE, no CSFB; After SRVCC → See other cases | After SRVCC + ICS (interim state) – last call in CS | Idle mode mobility between LTE and CS (ICS Fallback); In case of SRVCC then last call setup in CS | Idle mode mobility between LTE and CS (MSC enhanced for ICS); In case of SRVCC then last call setup in CS |

FIG. 3

HANDLING OF ACCESS CAPABILITY INFORMATION IN A MOBILE NETWORK

This application is a continuation of U.S. application Ser. No. 15/046,663, filed 18 Feb. 2016, which is a continuation of U.S. application Ser. No. 13/380,161, filed 18 Jan. 2012, now issued as U.S. Pat. No. 9,294,993, which is the U.S. National Stage of International Application No. PCT/EP2010/058029, filed 8 Jun. 2010, which claims benefit of U.S. Provisional Application No. 61/221,732, filed 30 Jun. 2009, the disclosures of all of which are incorporated by reference herein in their entirety.

TECHNICAL FIELD

The present invention relates to methods of handling an access capability information in a mobile network and to corresponding devices.

BACKGROUND

Mobile networks are currently evolving from pure circuit switched (CS) networks towards packet switched (PS) networks, in particular Internet Protocol (IP) based networks, and by that integrate into IP based infrastructures that are also used for the Internet, the World Wide Web and the datacom industry.

More specifically, technologies allowing voice communication over an IP based network have been introduced. Examples of such technologies are Voice over IP (VoIP) via DSL access or Voice over IP via WLAN access. In mobile networks, technologies allowing voice communication over an IP based network are being introduced as well. Examples of such mobile networks are mobile networks according to the Third Generation Partnership Project (3GPP) technical specifications (TS).

For example, mobile network operators may install IMS (IP Multimedia Subsystem) networks and offer IMS services. It is desirable to make these services available also to subscribers typically using a CS access to the mobile network, e.g. subscribers of 2G and 3G networks such as subscribers of a Global Systems for Mobile Communications (GSM) access or of a Wideband Code Division Multiplex (WCDMA) access. Other examples of 2G/3G access technology are General Packet Radio Service (GPRS), Enhanced Data Rates for GSM Evolution (EDGE) or Enhanced GPRS (EGPRS), Universal Mobile Telecommunications System (UMTS), and High Speed Packet Access (HSPA). Hereto, calls from and to this group of 2G/3G subscribers are routed through the IMS network in order for the IMS service engine to execute the call and call related services. This concept is called IMS Centralized Services (ICS). The IMS centralized Services specifications in 3GPP targets at using the CS access for access to IMS services, see 3GPP TS 23.292, and is complemented by IMS Service Continuity, see 3GPP TS 23.237.

Further, a technology referred to as Evolved Packet Core (EPC) is being introduced as part of the Evolved Packet System (EPS) of 3GPP Long Term Evolution (LTE), supporting a radio access network (RAN) referred to as Evolved UMTS Terrestrial Radio Access Network (E-UTRAN). In 3GPP LTE, voice communication is typically implemented using PS access, e.g. as Voice over IMS or using a technology referred to Voice over LTE via Generic Access (VoLGA), see the VoLGA stage 2 specification available in the internet via "http://www.volga-forum.com". Another way to implement voice communication in an mobile network supporting with LTE radio access networks is to use Circuit Switched Fallback (CSFB) to a 2G or 3G radio access networks, e.g. to a GSM EDGE Radio Access Network (GERAN) or to a UMTS Terrestrial Radio Access Network (UTRAN). The concept of CSFB is described in 3GPP TS 23.272. A study on the implementation of CS domain services in the EPS can be found in 3GPP Technical Report 23.879. It has also been proposed to implement single radio voice call continuity (SR-VCC), enabling inter domain Handover (HO) of an IMS voice call from PS domain to CS domain and vice versa (see 3GPP TS 23.216). It is desirable that SR-VCC may be combined with ICS for an IMS centralized solution supporting also SR-VCC from PS access via E-UTRAN or UTRAN to CS access via UTRAN or GERAN, and vice versa.

In the following, some aspects of mobility management in 3GPP will be described in more detail. FIGS. 1 and 2 schematically illustrate mobility scenarios in a mobile network with different types of access technology. FIGS. 1 and 2 both relate to a scenario in which the mobile network includes 2G access technology, e.g. GSM access technology, 3G access technology, e.g. WCDMA access technology, and LTE access technology. In FIG. 1, the 2G access technology has a Location Area (LA) and routing area (RA) 200A, see 3GPP TS 23.060, which are separate from the LA and RA 200B of the 3G access technology. The 2G access technology is controlled by a 2G Serving GPRS Support Node (SGSN) 110A, the 3G access technology is controlled by a 3G SGSN 110B, and the LTE access technology is controlled by an LTE Mobility Management Entity (MME) 110C. In FIG. 2, the 2G access technology and the 3G access technology have a combined LA and RA 200A/B and are controlled by a combined 2G/3G SGSN 110A/B. As illustrated by the arrows of FIGS. 1 and 2, a UE may move from 2G/3G access technology to LTE access technology, and vice versa. When moving from 2G/3G access technology to LTE access technology, information concerning an LTE tracking area (TA) 100C, see 3GPP TS 23.401, may be updated by performing a Tracking Area Update (TAU). When moving from LTE access technology to 2G/3G access technology, information concerning the 2G/3G LA/RA may be updated by performing a Location Area Update (LAU) or Routing Area Update (TAU).

To reduce the signaling when moving back and forth between 2G/3G access networks and LTE access networks in idle mode, a mechanism has been implemented which is referred to as Idle Mode Signaling Reduction (ISR), see 3GPP TS 23.401. ISR is mandatory in the terminals and optional for the network. ISR requires an S4-SGSN, i.e. an SGSN with an S4 interface towards the MME. If the underlying 2G/3G network has separate LA/RA for 2G and 3G, ISR is presently only possible between either LTE and 2G or between LTE and 3G, not both at the same time. If the underlying 2G/3G network has combined LA/RA for 2G and 3G then ISR is possible between LTE and 2G/3G. Here, it is to be noted that with combined 2G/3G RAU/LAU it is unknown whether the UE is in GSM or WCDMA/HSPA coverage.

When performing idle mode mobility between LTE and 2G/3G in case ISR is active, a User Equipment (UE) will typically not perform TAU, RAU or LAU, and the UE will not perform IMS (re-)registration. In case ISR is not active, the UE will not perform IMS (re-)registration. When performing idle mode mobility between HSPA and GSM in case of combined RA/LA, the UE might not perform RAU or LAU. It is presently known that the UE performs LAU when the received LAI (Location Area Identifier) is different from the stored LAI, when LAU is needed for a periodic location update, see 3GPP TS 24.008, when VoLGA is used, or when the MSC (Mobile Switching Center) serving the 2G/3G target cell is different from the MSC that served the UE while camping on E-UTRAN, see 3GPP TS 23.272. If neither CS fallback nor VoLGA is being used, the LTE coverage is a "coverage hole" from a CS perspective, i.e. there is generally no location update performed when a UE returns from LTE to CS. If the UE has been CS attached before entering LTE, then the UE will perform LAU when re-entering UTRAN or GERAN coverage only if the LAI has changed or the periodic LAU timer has expired. If the UE has not been CS attached before entering LTE, then the UE will perform LAU when entering UTRAN or GERAN coverage.

The table of FIG. 3 gives an overview on possible terminating call cases for a UE moving between LTE and CS: Here, it is to be noted that corresponding call cases exist if the UE moves between HSPA and CS. In the mobile network, a server termed as Service Centralization and Continuity Application Server (SCC AS), defined in 3GPP TS 23.292 and TS 23.237, decides whether to terminate a call in CS or in PS using LTE or HSPA. In this respect, termination of a call session, or connection refers to the process of supplementing an incoming call, session or connection to the UE by an access leg from the mobile network to the UE, which can be accomplished using PS access or using CS access. In 3GPP TS 23.237 and 23.292, this process is also referred to as Terminating Access Domain Selection (T-ADS). In the table of FIG. 3, "MSC-S registered" means that the MSC-S (MSC Server) is enhanced for ICS and registers the user in IMS.

In the following, termination scenarios in case of idle mode mobility will be further explained. In general, the T-ADS schemes cause the SCC AS to keep track of IMS registrations and the last used domain, which includes the case of an ongoing call. Hence, the following termination scenarios are possible: If the UE is only IMS registered for audio via LTE/HSPA, and UE has used LTE/HSPA for the last call, the SCC AS decides to terminate the call via LTE/HSPA. If the UE is only IMS registered for audio via LTE/HSPA and CS was used for the last call, the SCC AS decides to terminate the call via CS. This may happen after SRVCC when the UE is still IMS registered for audio but the MSC Server has transferred the last call to CS and a terminating call is coming in. If the UE is only IMS registered for audio by MSC Server, the SCC AS decides to terminate the call via MSC Server. If the UE registered for audio both via LTE/HSPA and via MSC Server, the SCC AS decides to terminate the call via the last used domain, the domain last registered in, or according to user or operator preference. If there is no IMS registration of the UE, the SCC AS decides to deliver the terminating call via MSC Server not enhanced for ICS ("break-out to CS domain"). Accordingly, the SCC AS will try first to terminate the call via the last-used domain. In case of termination over PS while the UE is camping on GERAN/UTRAN, either T-ADS by the UE is used or an error case is reported to the SCC AS. If there is no response, a timer expires, or an error case is reported, e.g. as mentioned above, the SCC AS tries the other domain.

Moreover, the idle mode mobility between LTE/HSPA and 2G/3G generally means that, if the UE is attached in CS and has performed IMS registration over LTE/HSPA, it may in addition be registered by the MSC Server. Further, it is to be noted that an IMS capable UE can be registered in the IMS also when using a GERAN or UTRAN access.

However, some situations may arise in which the known T-ADS procedures cause an undesirable delay or result in undesired signalling traffic by the UE. In a first example of such situations, ISR is active and the UE does not perform TAU, RAU/LAU when switching between LTE and 2G/3G. Accordingly, there is a higher likelihood that SCC AS does not know the current access domain of the UE. This may result in an unsuccessful attempt to terminate via PS while the UE is camping on GERAN/UTRAN, and may add delay to the termination process. In a second example of such situations, ISR is not active or not used and the UE performs RAU/LAU, TAU when switching between LTE and 2G/3G. Here, it should be noted that support of MMTel (Multimedia Telephony) on HSPA assumes separate RA/LA for 2G and 3G. In case of LAU, the MSC Server may perform (re-) registration in the IMS as specified in 3GPP TS 23.292, thereby indicating the UE is reachable on CS. If the MSC Server is not enhanced, the SCC AS may rely on CS attach information in the Home Location Register (HLR) to determine whether the subscriber is reachable in CS. The UE could therefore update registration when the access capability for VoIP changes. The UE could also update its access capability for VoIP once it has determined that the used access is not frequently changing. The SCC AS may also use, e.g., Mobile Application Part AnyTime Interrogation (MAP ATI) to check the time stamp of last attach when terminating a call. In the second example, unsuccessful attempts to terminate over PS while the UE is camping on GERAN/UTRAN may be avoided because there is a higher likelihood that the SCC AS knows the current access domain of the UE. However, the signaling load is increased.

So it may happen that the SCC AS has a valid IMS registration for audio via LTE/HS and will therefore try to terminate the call towards the registered contact, but the UE might have been moved into GERAN/UTRAN, and thereby out of the VoIP capable coverage. Then either UE T-ADS has to be used and/or an error case is reported to the SCC AS (see 3GPP TS 23.292). In case of UE T-ADS, the UE may setup a CS bearer or inform the SCC AS about the error condition that the PS domain cannot be used. The SCC AS, if receiving an error response from the UE, will try the CS domain for termination instead.

In either case, the call setup time is increased by the need to establish either a CS originating call leg or a CS terminating call leg if call setup via PS failed.

In case ISR is active the UE will not perform TAU/RAU per TA list/RA. This reduces the signaling with the core network, but at the same time increases the likelihood that the SCC AS does not know the current access domain the UE is camping on. This is especially true in case the UE is in idle mode and not performing IMS registration. When the UE is active in a call, the SCC AS will typically know about the access domain used by the UE.

When now looking closer at the case when ISR is not active, it can be observed that the UE performs RAU/LAU, TAU when switching between LTE and 2G/3G. In case of MMTel support on HSPA, this only applies when there is separate RA/LA for 2G and 3G.

The UE will receive an "IMS voice over PS session supported indication" from MME, SGSN or both per TA list/RA. These indications are valid in the same TA/RA. UE can remember the "IMS voice over PS session supported indication" for each the RA and TA the UE has a valid registration in, independent on whether ISR is used or not.

So if the UE would have the indication that IMS PS Voice is possible over LTE and would move to UTRAN/GERAN and IMS PS Voice is not possible there, then even if the UE would perform RAU then the IMS and the SCC AS in particular have incorrect information about the PS access capability since relying on the IMS registration and hence cannot make a correct terminating domain selection.

As can be seen, the existing solutions are increasing the delay for terminating calls, e.g. as in the first example above, or increase the signaling load, e.g. by requiring the UE to update the IMS registration when access capability for VoIP changes as in the second example above, which may drain the battery of the UE, especially when the UE is in idle mode. In one case, there is a lack of knowledge of the SCC AS with respect to an access capability of the UE, e.g. support of voice communication over a PS access, which may result in unsuccessful termination attempts and increased delay. In the other case, access capability information is made available at the cost of an increased signaling load with respect to the UE, which is undesirable, e.g. in view of battery lifetime.

Accordingly, there is a need for techniques which allow for efficiently handling access capability information of the UE in the presently used access network.

SUMMARY

According to an embodiment of the invention, a method is provided which can be used to control communication of a user equipment in a mobile network with a plurality of access networks. According to the method, a control node which is controlling access of the user equipment to that one of the access networks which is currently used by the user equipment determines an access capability of the user equipment in said access network. An indication of the determined access capability is provided to a subscriber database associated with the user equipment.

According to a further embodiment of the invention, a method is provided which can be used to control communication of a user equipment in a mobile network with a plurality of access networks. According to the method, an indication of an access capability of the user equipment in that one of the access networks which is currently used by the user equipment is received from a subscriber database associated with the user equipment. On the basis of the received indication, termination of a connection to the user equipment is controlled.

According to a further embodiment of the invention, a method is provided which can be used to control communication of a user equipment in a mobile network with a plurality of access networks. According to the method, an indication of an access capability of the user equipment in that one of the access networks which is currently used by the user equipment is received in a subscriber database associated with the user equipment. The indication is stored in the subscriber database. Further, the indication is transmitted from the subscriber database to a server configured to control termination of connections to the user equipment.

According to a further embodiment of the invention, a control node is provided. The control node may be used in a mobile network with a plurality of access networks. The control node is configured to control access of a user equipment to that one of the access networks which is currently used by the user equipment. Further, the control node is configured to determine an access capability of the user equipment in said access network and to transmit an indication of the determined access capability to a subscriber database associated with the user equipment.

According to a further embodiment of the invention, a server is provided. The server may be used in a mobile network with a plurality of access networks. The server is configured to control providing of terminating connections to a user equipment. More specifically, the server is configured to receive, from a subscriber database associated with the user equipment, an indication of an access capability of the user equipment in that one of the access networks which is currently used by the user equipment, and to control termination of a connection to the user equipment on the basis of the received indication.

According to a further embodiment of the invention, a subscriber database is provided. The subscriber database may be used in a mobile network with a plurality of access networks and is associated with a user equipment. The subscriber database is configured to receive an indication of an access capability of the user equipment in that one of the access networks which is currently used by the user equipment from a control node controlling access of the user equipment to said access network, to store the indication and to transmit the indication to a server configured to control termination of connections to the user equipment.

According to further embodiments, other methods, network components, or computer program products may be provided.

BRIEF DESCRIPTION OF THE DRAWINGS

FIG. 3 shows a table illustrating possible terminating call cases for a UE moving between an LTE access network and a CS access network.

DETAILED DESCRIPTION

In the following, the invention will be explained in more detail by referring to exemplary embodiments and to the accompanying drawings. The illustrated embodiments relate to handling of access capability information in a mobile network, e.g. a mobile network including both LTE access networks and 2G/3G access networks. However, it is to be understood that the concepts as described herein may also be applied in other types of mobile network, e.g. a mobile network providing PS access via HSPA and 2G/3G CS access.

Figure 4:
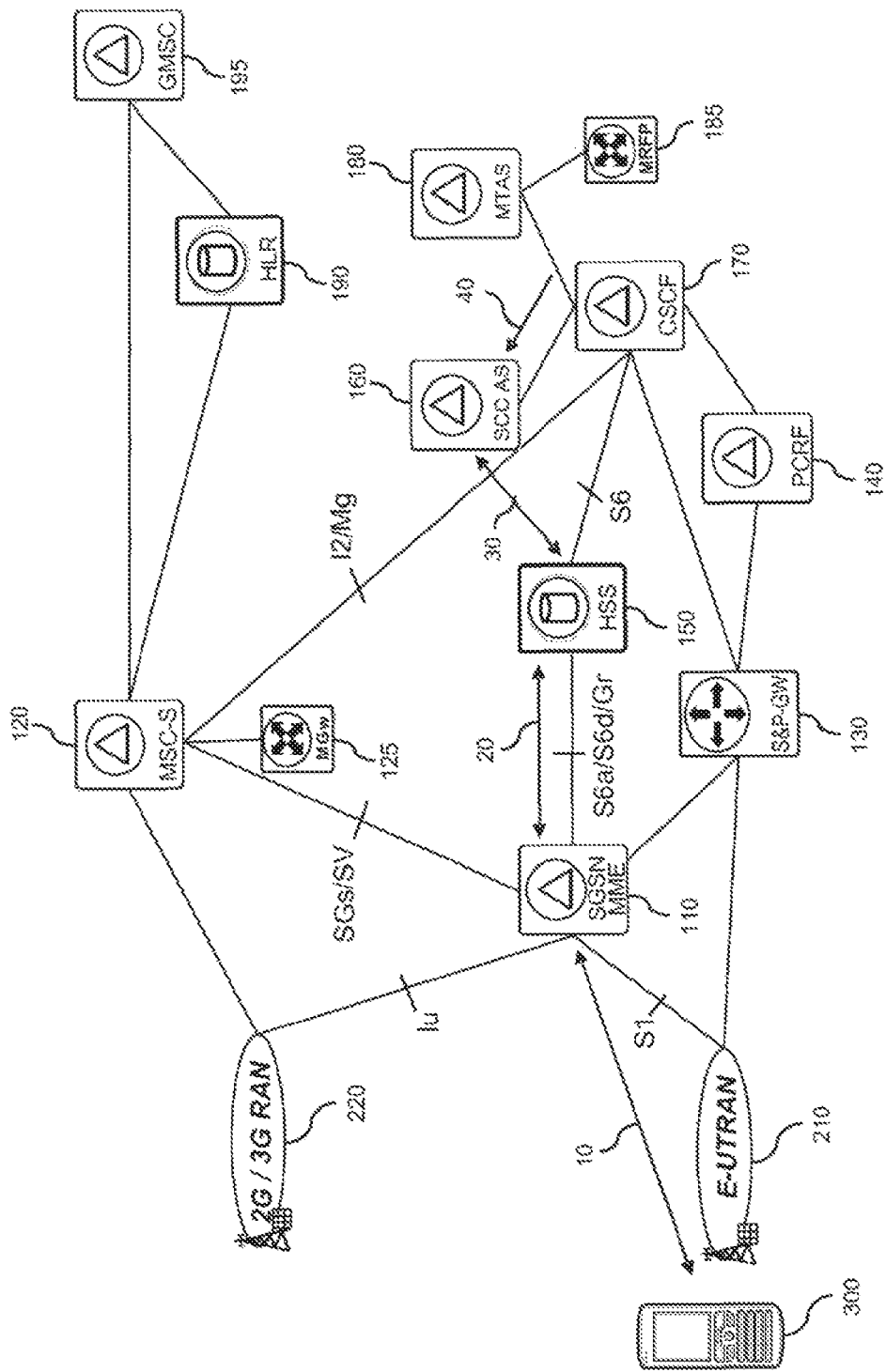
FIG. 4 schematically illustrates a mobile network environment in which concepts according to an embodiment of the invention are implemented.

FIG. 4 schematically illustrates a mobile network environment including LTE access networks and 2G/3G access networks. In FIG. 4, E-UTRAN 210 is shown as an example of the LTE access networks, and 2G/3G RAN 220 as an example of the 2G/3G access networks. The RANs 210, 220 may support different access types, i.e. CS access, PS access, or both. In the illustrated mobile network, the E-UTRAN 210 supports PS access whereas the 2G/3G RAN supports both PS access and CS access. However, the PS access supported by the E-UTRAN 210 and/or in particular by the 2G/3G RAN 220 may in some cases be not suitable to support voice communication, e.g. IMS voice services.

Figure 1:
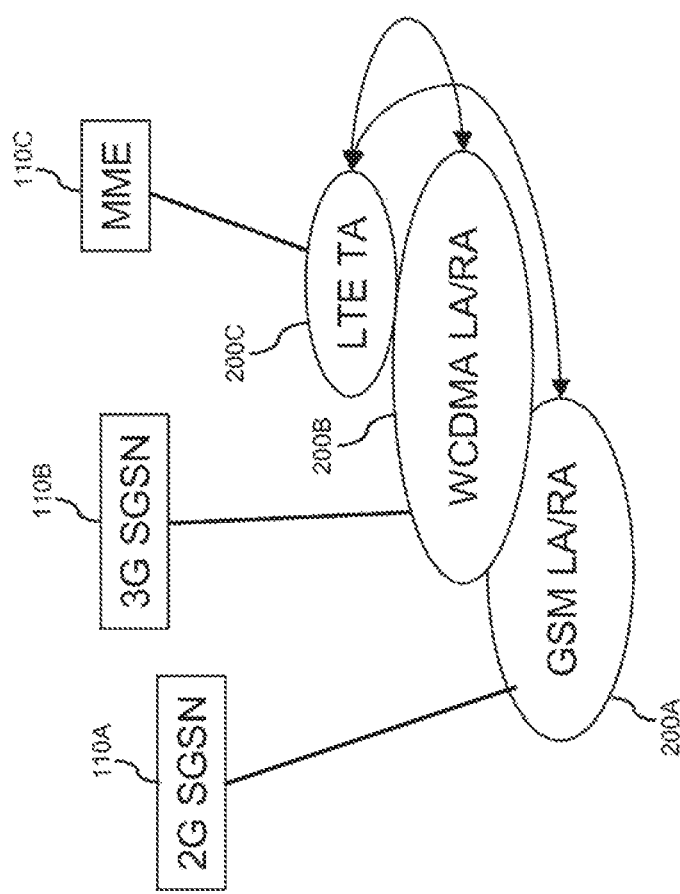
FIG. 1 schematically illustrates mobility in an exemplary mobile network with 2G/3G access technology and LTE access technology.
Figure 2:
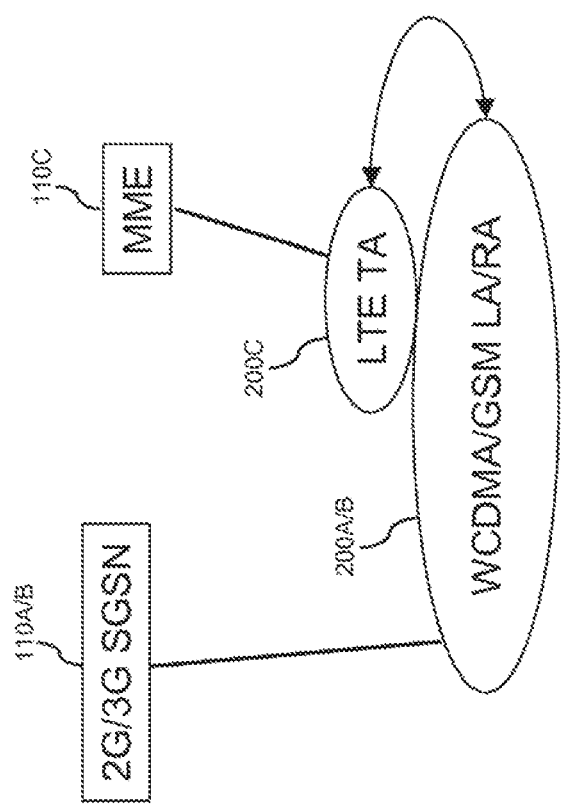
FIG. 2 schematically illustrates mobility in a further exemplary mobile network with 2G/3G access technology and LTE access technology.

The PS access functions of the different RANs 210, 220 are controlled by corresponding control nodes. That is to say, in accordance with the 3GPP TS, the LTE access networks are controlled by one or more control nodes having MME functionality, and the 2G/3G access networks are controlled by one or more control nodes having SGSN functionality. In the following, the control node 110 will therefore also be referred to as SGSN 110, MME 110, or SGSN/MME 110. In FIG. 4, this is illustrated by control node 110. Here, it is to be understood that, for a better overview, only a single control node has been illustrated, which can act as an MME with respect to the E-UTRAN 210 and can act as an SGSN with respect to the 2G/3G RAN. In practice, a plurality of control nodes will be provided in the mobile network, e.g. a plurality of control nodes having MME functionality and a plurality of control nodes having SGSN functionality. Further, separate control nodes having SGSN functionality may be provided for 2G and 3G RANs (see FIG. 1). Also, it is to be understood that each control nodes typically serves a plurality of RANs. Further functionalities of the control node 110, which are specific to embodiments of the invention, will be described below.

Similarly, the CS access functions of the 2G/3G RAN 220 are controlled by a corresponding control node 120. For example, the control node 120 may implement functionalities of an MSC-S according to the 3GPP TS. In the following, the control node 120 will ignallin also be referred to as MSC-S 120. Again, it is to be understood that the mobile network may actually include a plurality of control nodes having MSC-S functionality, and that each of such control nodes may serve a plurality of 2G/3G access networks.

Accordingly, the mobile network of FIG. 4 includes a PS access domain with the E-UTRAN 210, the 2G/3G RAN and the control node 110, and a CS access domain with the 2G/3G RAN and the control node 120.

As illustrated, the PS access domain further includes a gateway node 130, a policy control node 140, a subscriber database 150, a session continuity application server 160, a call session control node 170, and other application servers, e.g. a multimedia application server 180 which may be coupled to a multimedia processing node 185. The gateway node 130 may be implemented as a Serving Gateway (S-GW) or as a Packet Data Network Gateway (PDN GW) according to the 3GPP TS. In the following, the gateway node 130 will therefore also be referred to as S-GW 130 or PDN GW 130. The policy control node 140 may be implemented as a Policy and Charging Rules Control Function (PCRF) according to the 3GPP TS. The call session control node 170 may be implemented as a Call Session Control Function (CSCF) according to the 3GPP TS, which may include the Proxy-CSCF (P-CSCF) and the Serving-CSCF (S-CSCF) subfunctions. In the following, the call session control node 170 will ignallin also be referred to as CSCF 170 or, according to its particular subfunction, as P-CSCF 170 or S-CSCF 170. The multimedia application server 180 may be a Multimedia Telephony Application Server (MTAS) according to 3GPP TS 24.173 and the multimedia processing node may be a Multimedia Resource Function Processor (MRFP) according to 3GPP TS 23.333.

The subscriber database 150 is configured to store subscriber data. For this purpose, the subscriber database is associated with a particular subscriber or the UE 300 used by the subscriber. In other words, the subscriber database 150 is a uniquely defined location for storing data relating to a particular subscriber. The subscriber database 150 may be implemented as a Home Subscriber Server (HSS) according to 3GPP TS 23.002 and 23.008. In the following, the subscriber database 150 will ignallin also be referred to as HSS 150. Further functionalities of the subscriber database 150, which are specific to embodiments of the invention, will be described below. Unless described otherwise, the session continuity application server 160 may implement functionalities of an SCC AS according to 3GPP TS 23.237 and 23.292. Functionalities of the session continuity application server 160, which are specific to embodiments of the invention, will be described below.

As illustrated, the CS access domain further includes a media gateway node 125 coupled to the control node 120, a subscriber data register 190, and a gateway control node 190. The media gateway node 125 may be a Media Gateway (MGw) according to 3GPP TS 23.205. The subscriber data register may be a Home Location Register (HLR) according to 3GPP TS. The gateway node 190 may be a Gateway Mobile Switching Center (GMSC) according to the 3GPP TS.

Further, FIG. 4 schematically illustrates a UE 300. The UE 300 may be any type of mobile communication device, e.g. a mobile phone, a portable computer, or the like. It is assumed that the UE 300 is capable of using different types if access technology, in particular the above-mentioned LTE access technology and 2G/3G access technology. Further, it is assumed that the UE 300 is capable of using different access types provided by the access technologies, i.e. PS access and CS access. The capability of using a specific access type may, however, depend on the particular access network the UE 300 is using. For example, voice communication using PS access may be possible in the E-UTRAN 210, but not in the 2G/3G RAN 220. Also, a supported access capability may vary between access networks of the same type. For example, voice communication using PS access may be possible in only some of multiple 2G/3G RANs.

The above devices and nodes are coupled to each other as illustrated in FIG. 4. For this purpose, corresponding interfaces are provided between these nodes. For example, the MME 110 may be coupled to the E-UTRAN 210 using an S1 interface according to the 3GPP TS. The MME 110 may be coupled to the HSS 150 using a S6a interface according to the 3GPP TS. The SGSN 110 may be coupled to the 2G/3G RAN using a Iu interface according to the 3GPP TS. The SGSN 110 may be coupled to the HSS 150 using a S6d interface or a Gr interface according to the 3GPP TS. The SCC AS 160 may be coupled to the HSS 150 using a Sh interface according to the 3GPP TS. The SGSN/MME 110 may be coupled to the MSC-S 120 using a SGs or SV interface according to the 3GPP TS. The MSC-S 120 may be coupled to the CSCF 170 using a I2 or Mg interface according to the 3GPP TS. Other interfaces may be appropriately selected on the basis of the 3GPP TS as well.

In order to allow for efficient termination of sessions, concepts according to embodiments of the invention involve providing additional information to the SCC AS 160. More specifically, according to an embodiment, when performing attach or TAU/RAU, the MME/SGSN 110 provides an "IMS voice over PS session supported" indication to the UE 300. The "IMS voice over PS session supported indication" provides to the UE 300 the information on whether IMS voice over PS session is supported in the given TA list or RA list. In some cases, the MME/SGSN 110 provides this indication to the HSS 150 as well. According to an embodiment, these cases are: attaching of the UE to the mobile network, TAU/RAU of the UE to new MME/SGSN 110, and/or TAU/RAU of the UE and the access capability has changed.

Using the above concepts, the SCC AS 160 can retrieve, among other information, the indication whether or not IMS voice over PS is supported from the HSS 150 when interrogating for the attach status. The UE 300 can always stay registered in IMS for audio and the SCC AS 160 can determine whether the currently used access is VoIP capable or not. According to some embodiments, the SCC AS 160 can subscribe to changes of this HSS data. In this way, the SCC AS 160 can be informed automatically when the "IMS voice over PS session supported indication" has changed. If the currently used access is not VoIP capable, then the SCC AS 160 will terminate the session via CS. When assuming that support for IMS voice over PS is given per ISR area, i.e. access capability does not change within one ISR area, the above concepts are also compatible with ISR.

In the following an implementation of the above concepts will be described in more detail by referring to the signaling indicated in FIG. 4.

As indicated at 10, the UE 300 performs attach or TAU/RAU, and the MME/SGSN 110 provides the "IMS voice over PS session supported" indication to the UE 300. In the case the UE 300 attaches to a non-3GPP network that supports voice, a voice indicator may not be sent to the UE 300. However, in such a case the indicator may be registered by the network, e.g. the Serving or PDN-GW 130.

At 20, MME/SGSN 110 provides this "IMS voice over PS session supported" indication, i.e. the information if the UE is attached to a VoIP capable bearer or not, to the HSS 150. More specifically, this is done in case of: attach, in case of TAU/RAU to new MME/SGSN, and in case of TAU/RAU and the access capability has changed.

At 30, the SCC AS 160 can receive, typically along with other information, the indication whether or not IMS voice over PS is supported from the HSS 150 when interrogating for the attach status. In some embodiments, the SCC AS 160 can subscribe to changes of this HSS data over the Sh interface. In this way, the SCC AS 160 can be informed automatically when the "IMS voice over PS session supported" indication has changed and does not have to interrogate the HSS 150 for every terminating call. However, according to some embodiments, the SCC AS 160 may also request the information on IMS voice support over PS in response to every incoming terminating call.

At 40, a terminating session with speech media arrives for the UE 300. If the subscriber of the UE 300 is registered in the IMS for audio via a PS access and the currently used access is not VoIP capable, the SCC AS 160 will terminate the session via CS. If the subscriber of the UE 300 is registered in the IMS for audio via a PS access and the currently used access is VoIP capable, then the SCC AS will terminate the session via this PS access/contact.

Other terminating cases, e.g. not registered in IMS, only registered via MSC Server, may be handled as specified in 3GPP TS 23.292 and 3GPP TS 23.237.

The above-described mechanism provides the indication to the HSS 150 whether the access supports VoIP. However, the mechanism may be used with respect to other access capabilities as well. In the following, some examples of information will be given which is available at the MME 110 and can be provided to the HSS 150 and thereby to other functions or applications in the mobile network. According to one example, the information may indicate whether ISR is active or not. For example, e.g. if ISR is active the SCC AS could be prepared by adjusting timers that the termination via PS may fail. According to a further example the information may indicate whether CSFB Short Message Service (SMS) is available or not. For example, this might be of interest for the IP SM GW as specified in 3GPP TS 23.204 to be informed that message delivery via CS will work even if the UE 300 is camping on the E-UTRAN 210. According to a further example, the information may indicate whether CSFB voice service is available or not. For example, if the SCC AS 160 cannot be sure that termination via PS will be successful, it would know thereby that termination via CS will always work even if the UE 300 is camping on the E-UTRAN 210.

In the following, the above concepts will be compared to alternative options of providing additional information to the SCC AS 160.

According to a first alternative option, the UE 300 updates the IMS registration when access capability for VoIP changes, once it has determined that the access is not frequently changing, taking into account operator policies. This would result in that the SCC AS 160 will not try termination over PS while UE is camping on the 2G/3G RAN, e.g. on GERAN or UTRAN.

While the first alternative option increases signaling by enforcing to update the IMS registration when the UE 300 moves between accesses with different capability for VoIP, it also reduces the terminating call setup time in some relevant scenarios. Initially there will be only a few Ues with the required capabilities, so the additional load seems acceptable. Also the impact on the battery consumption should be low when deciding to re-register only in case the access is not frequently changing. Later, when LTE coverage or VoIP coverage in general have improved, there will be fewer cases in which the UE 300 has to update its IMS registration due to access capability changes.

According to a second alternative option, the SCC AS 160 always performs a check of the HSS 150 (e.g. using ATI) for the CS location update status. In case there is no IMS registration by the MSC Server and the location update has a been performed more recently than the last IMS registration via LTE/HS, then the SCC AS 160 should terminate the call via CS.

The second alternative option requires that the SCC AS 160 interrogates with the HSS 150 to retrieve the CS location update status for every terminating session even if there is a valid IMS registration. It further implies that termination via CS gets precedence over termination via IMS in all cases the UE is more likely camping on a non-VoIP capable access. The UE would have to register in the IMS when moving into LTE in order to ensure that the IMS registration has a new time stamp. In case of HSPA only coverage, the same procedure applies. In case CS is possible as well in HSPA/UTRAN, the UE 300 needs to provide the information to the SCC AS whether IMS termination or CS termination is preferred.

According to a third alternative option, when performing the IMS registration, the P-CSCF subscribes to changes of IP-CAN (IP-Connectivity Access Network) type over Rx. Furthermore, the P-CSCF will be notified that the S-CSCF or SCC AS 160 should be notified when the IP-CAN is changing for the user, which may require disabling of ISR when the UE is in idle mode. When the IP-CAN changes the PCRF 140 notifies the P-CSCF of the IP-CAN change. The P-CSCF then sends a notification of the updated IP-CAN to the S-CSCF/SCC AS 160. This typically requires Back to Back User Agent (B2BUA) functionality in the P-CSCF, as well as mandating PCC (Policy Control and Charging).

The first and second alternative options require that the UE 300 performs IMS registration either when access capability for VoIP changes (first alternative option) or when the UE 300 is moving to LTE. In either case, this is necessary also in idle mode. The third alternative option does not require signaling by the UE 300, i.e. is "network only". However, it mandates PCC and requires that the P-CSCF has B2BUA functionality.

As compared to that, the above concepts according to embodiments of the invention do not require signaling by the UE 300, i.e. are "network only" and is based on some additional signaling so that the MME/SGSN 110 can provide the HSS 150 the "IMS voice over PS session supported indication" and changes of it. The SCC AS 160 can then be informed automatically when the indication is updated. Using a "network only" solution is considered to be advantageous to avoid over that air signaling and battery drain in idle mode. Moreover, providing the information on the VoIP capability in the HSS 150 allows this information to be used not only by the SCC AS 160 but also by other functions in the network if needed.

The above concepts allow that the UE 300 can always stay registered in IMS for audio and the SCC AS 160 can determine whether the currently used access is VoIP capable or not and to use this information to make a correct decision whether to terminate a session on the PS access or to break out to CS. Further, under the assumption that support for IMS voice over PS is given per ISR area, i.e. the access capability does not change within one ISR area, the concepts are also compatible with ISR. Here, an ISR area is an area, including TA and RA, in which ISR can be declared as activated by the SGSN and MME. Further, the concepts may be used to ensure that the HSS 150 contains up-to-date information about access capabilities, e.g. VoIP, SMS and CSFB, which information can then be used by IMS but also by other network functions.

Figure 5:
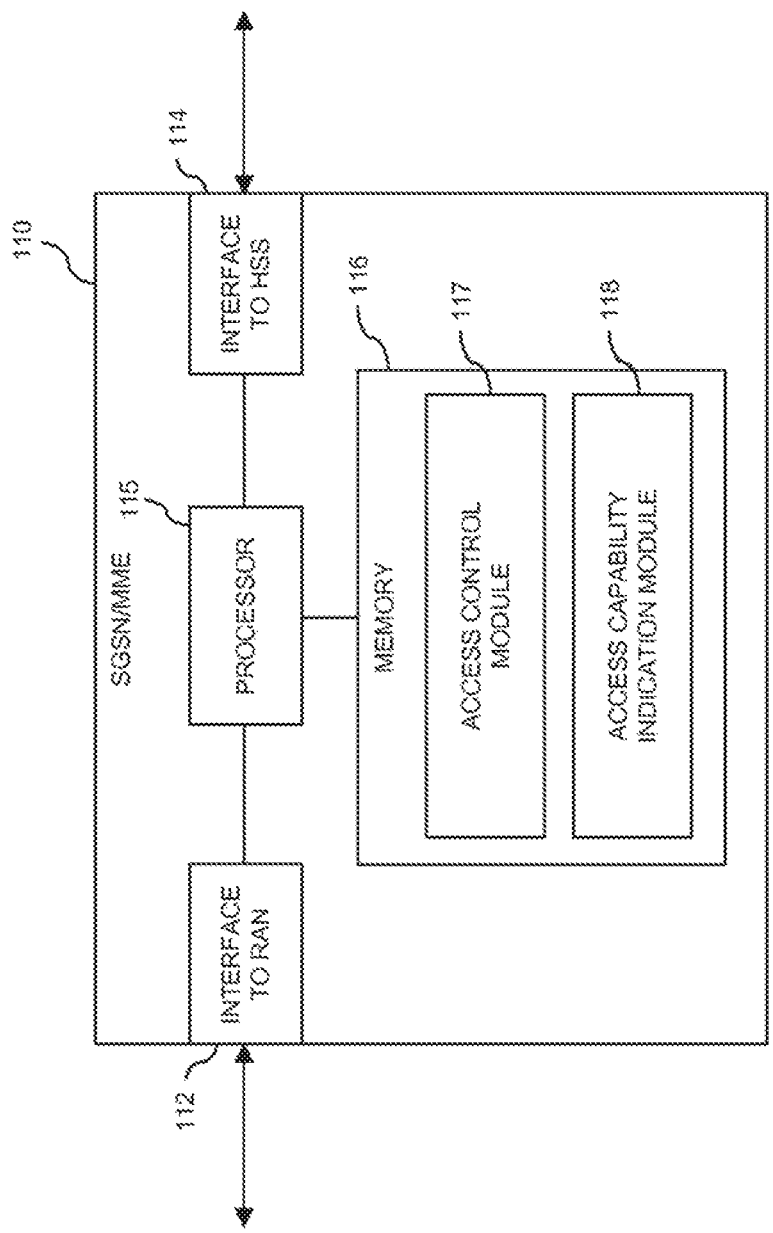
FIG. 5 schematically illustrates a control node according to an embodiment of the invention.

FIG. 5 further illustrates an exemplary implementation of the control node 110. As explained above, the control node may be configured to be operated as an SGSN or MME according to the 3GPP TS.

The control node 110 includes a RAN interface 112 to one or more RANs, e.g. the E-UTRAN 210 or the 2G/3G RAN 220. If the control node has SGSN functionality, the RAN interface 112 will be to the 2G/3G RAN 220 and be implemented as a Gb or Iu interface according to the 3GPP TS. If the control node 160 has MME functionality, the RAN interface 112 will be to the E-UTRAN 210 and be implemented as a S1 interface according to the 3GPP technical specifications. In addition the control node has an interface 114 with to the HSS 150. If the control node 160 has SGSN functionality, the interface 114 may be implemented as a S6d interface or a Gr interface according to the 3GPP TS. If the control node 160 has MME functionality, the interface 114 may be implemented as a S6a according to the 3GPP TS. Further, the control node 160 includes a processor 115 coupled to the interfaces 112, 114 and a memory 116 coupled to the processor 115. The memory 116 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 116 includes suitably configured program code to be executed by the processor 116 so as to implement the functionalities of the control node 160 as explained above. More specifically, the memory 116 may include an access control module 117 so as to implement access control functionalities, e.g. establishing, modifying or dropping of bearers via a connected RAN, and an access capability indication module 118 so as to implement the above-described functionalities of indicating an access capability to the UE and/or to the HSS.

It is to be understood that the structure as illustrated in FIG. 5 is merely schematic and that the control node 110 may actually include further components which, for the sake of clarity, have not been illustrated, e.g. further interfaces. Also, it is to be understood that the memory 116 may include further types of program code modules, which have not been illustrated, e.g. program code modules for implementing known functionalities of an SGSN or MME according to the 3GPP TS.

Figure 6:
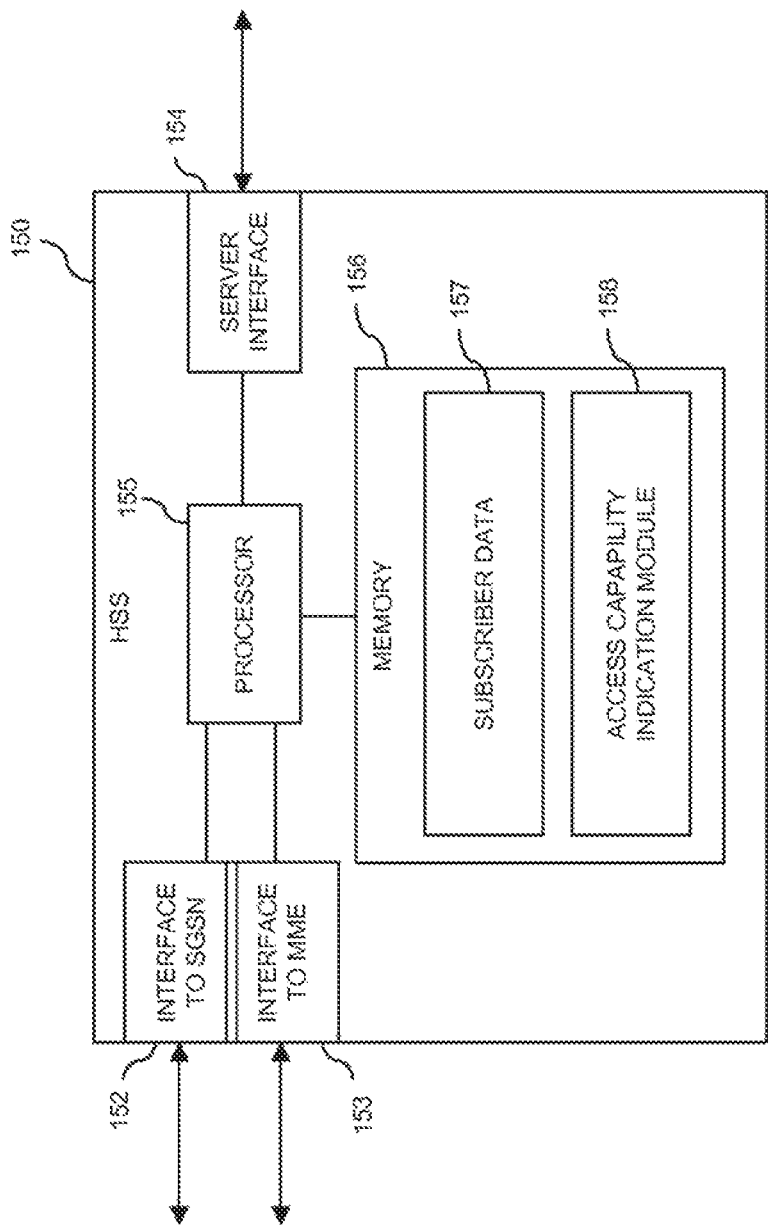
FIG. 6 schematically illustrates a subscriber database according to an embodiment of the invention.

FIG. 6 further illustrates an exemplary implementation of the subscriber database 150. As explained above, the subscriber database 150 may be configured to be operated as an HSS according to the 3GPP TS.

The subscriber database 150 includes a first control node interface 152, which has the purpose of coupling the subscriber database 150 to the SGSN, e.g. implemented by the control node 110, a second control node interface 153, which has the purpose of coupling the subscriber database to the MME, e.g. implemented by the control node 110, and a server interface 154, which has the purpose of coupling the subscriber database 150 to one or more servers, e.g. the SCC AS 160, or other network functions. The first control node interface 152 may be implemented as a S6d interface or a Gr interface according to the 3GPP TS. The second control node interface 153 may be implemented as a S6a interface according to the 3GPP TS. In some embodiments, only one of the first control node interface 152 and the second control node interface 153 may be provided, or these interfaces may be combined in a single interface. The server interface 154 may be a Sh interface according to the 3GPP TS. Further, the subscriber database 150 includes a processor 155 coupled to the interfaces 152, 153, 154 and a memory 156 coupled to the processor 155. The memory 156 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 156 includes data and suitably configured program code to be executed by the processor 156 so as to implement the functionalities of the subscriber database 150 as explained above. More specifically, the memory 156 may include subscriber data 157, in particular the subscriber related information with respect to the access capability indication, and a access capability indication module 158 so as to implement functionalities needed to handle the information with respect to the access capability, e.g. receiving the information from the control node, storing the information, or providing the information to a requesting or subscribed server, e.g. to the SCC AS 160.

It is to be understood that the structure as illustrated in FIG. 6 is merely schematic and that the subscriber database 150 may actually include further components which, for the sake of clarity, have not been illustrated. Also, it is to be understood that the memory 156 may include further types of subscriber data and program code modules, which have not been illustrated, e.g. program code modules for implementing known functionalities of a HSS according to the 3GPP TS.

Figure 7:
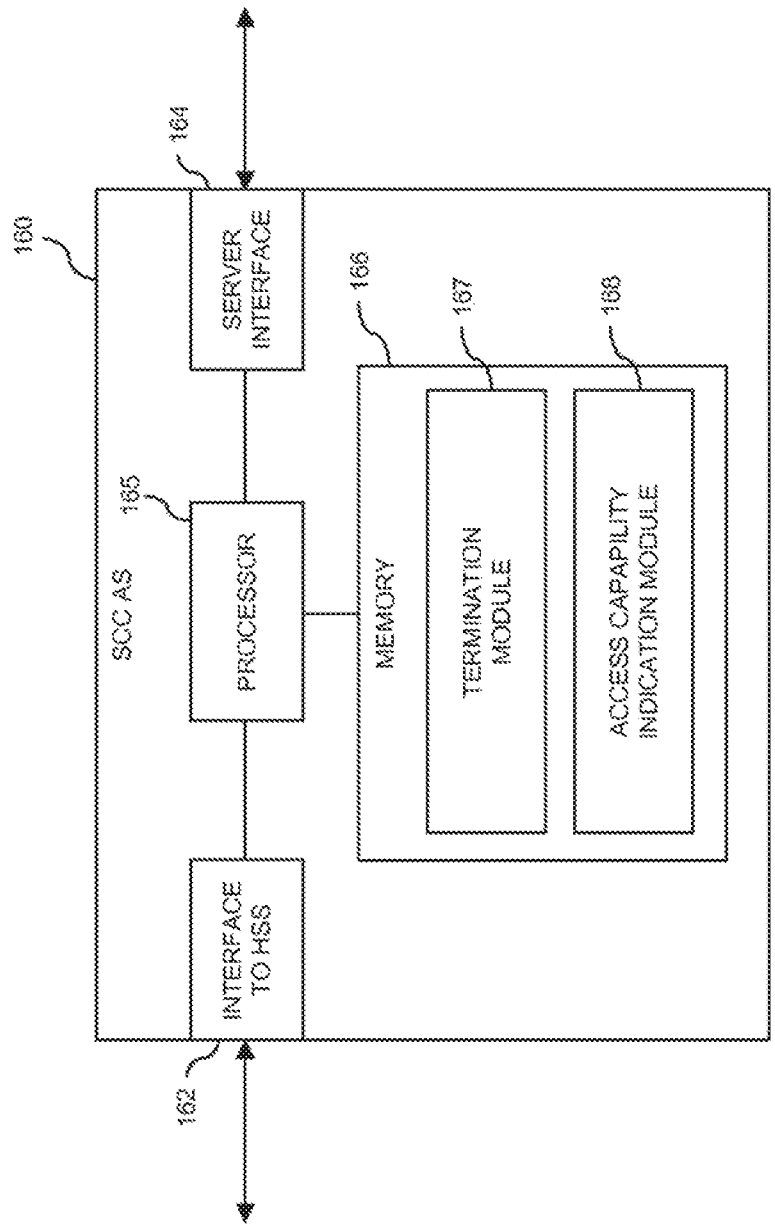
FIG. 7 schematically illustrates an application server according to an embodiment of the invention.

FIG. 7 further illustrates an exemplary implementation of the application server 160. As explained above, the application server 160 may be configured to be operated as an SCC AS according to the 3GPP TS.

The application server 160 includes a HSS interface 162, which has the purpose of coupling the application server to the HSS, e.g. implemented by the subscriber database 150, and a server interface 164, which has the purpose of coupling the application server 160 to other servers or network functions, e.g. to the CSCF 170 as illustrated in FIG. 4. The HSS interface 162 may be implemented as a Sh interface according to the 3GPP TS. The server interface 164 may be implemented as a ISC interface according to the 3GPP TS. Further, application server 160 includes a processor 165 coupled to the interfaces 162, 164 and a memory 166 coupled to the processor 165. The memory 166 may include a read-only memory (ROM), e.g. a flash ROM, a random-access memory (RAM), e.g. a Dynamic RAM (DRAM) or static RAM (SRAM), a mass storage, e.g. a hard disk or solid state disk, or the like. The memory 166 includes suitably configured program code to be executed by the processor 166 so as to implement the functionalities of the subscriber database 160 as explained above. More specifically, the memory 166 may include a termination module 167 so as to control termination of connections in the above-described manner, and an access capability module 168 so as to implement functionalities needed to handle the information with respect to the access capability, e.g. requesting the information from the HSS and, if needed, temporarily storing the information.

It is to be understood that the structure as illustrated in FIG. 7 is merely schematic and that the application server 160 may actually include further components which, for the sake of clarity, have not been illustrated. Also, it is to be understood that the memory 166 may include further types of subscriber data and program code modules, which have not been illustrated, e.g. program code modules for implementing known functionalities of a SCC AS according to the 3GPP TS.

Figure 8:
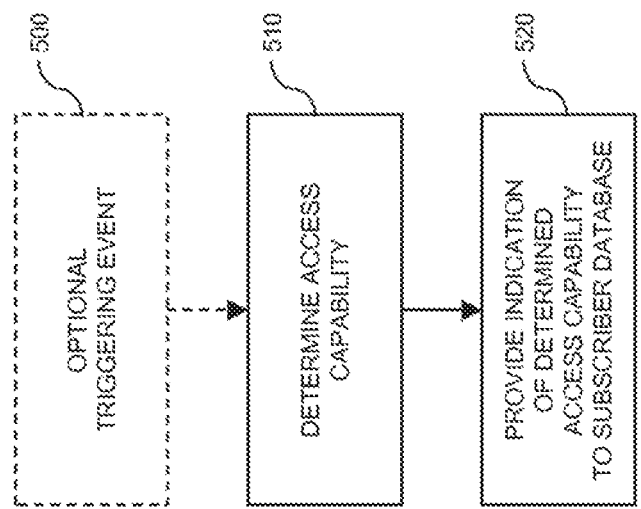
FIG. 8 shows a flowchart for illustrating a method according to an embodiment of the invention.

FIG. 8 shows a flowchart illustrating a method according to an embodiment of the invention. The method may be used in a mobile network with multiple access networks, e.g. in the mobile network as illustrated in FIG. 4, for controlling communication of a UE, e.g. the UE 300. More specifically, the method may be used for handling of access capability information in the control node 110 of FIGS. 4 and 5.

Step 500 illustrates an optional triggering event. The triggering event may be the UE attaching to the mobile network, the UE moving from another access network to the currently used access network, and/or a change of access capability.

At step 510, an access capability of the UE in that one of the access networks which is currently used by the UE is determined. Here, it is to be understood that the UE may also be in an idle mode, e.g. not be engaged in a call. The access capability may be support of voice communication over PS access, in particular support of IMS voice over PS session. The access capability may also be or include support of circuit switched fallback for short message service, support of circuit switched fallback for voice service, and/or idle mode ignalling reduction being active or not From a perspective of the UE, the access capability may vary, e.g. if the UE moves from one of the access networks to another one of the access networks, e.g. to an access network using different access technology.

At step 520, an indication of the determined access capability is provided to a subscriber database, e.g. to the HSS 150 as discussed in connection with FIG. 4. The indication may be provided in response to an event, e.g. in response to the UE attaching to the mobile network, in response to the UE moving from another access network to the currently used access network, and/or in response to the access a capability having changed. For this purpose, the UE may perform LAU, RAU, or TAU. The event may also trigger the determination of the access capability, e.g. as indicated by the optional triggering event 500.

The information with respect to the access capability may then be stored in the subscriber database so as to be used by other network devices or functions. In particular, the information may be used for controlling the termination of sessions.

Figure 9:
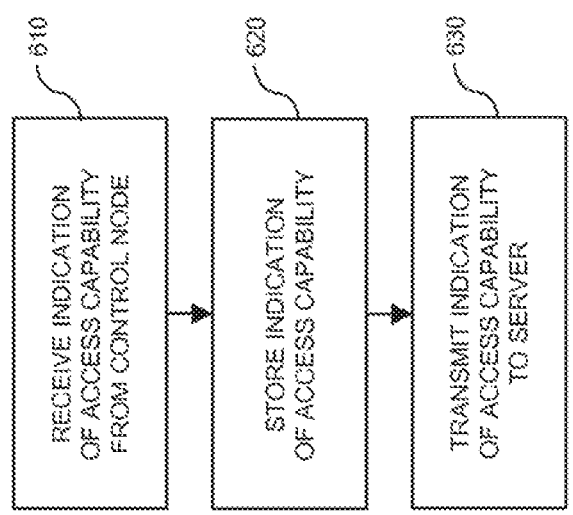
FIG. 9 shows a flowchart for illustrating a further method according to an embodiment of the invention.

FIG. 9 shows a flowchart illustrating a further method according to an embodiment of the invention. The method may be used in a mobile network with multiple access networks, e.g. in the mobile network as illustrated in FIG. 4, for controlling communication of a UE, e.g. the UE 300. More specifically, the method may be used for handling of access capability information in the subscriber database 150 of FIGS. 4 and 6.

At step 610, the subscriber database, which is associated with the UE, receives an indication of an access capability of the UE in that one of the access networks which is currently used by the user equipment. The indication may be received from a control node controlling access of the UE to this access network, e.g. the control node 110 of FIGS. 4 and 5. As mentioned above, the access capability may be support of voice communication over PS access, in particular support of IMS voice over PS session. The access capability may also be or include support of circuit switched fallback for short message service, support of circuit switched fallback for voice service, and/or idle mode ignalling reduction being active or not.

At step 620, the indication is stored in the database. In particular, the indication may be stored in a data record uniquely related to a subscriber using the UE.

At step 630, the subscriber database transmits the indication to a server configured to control termination of connections to the UE, e.g. to the session continuity application server 160 of FIGS. 4 and 7. The indication may be transmitted in response to a request message from the server, e.g. on an as-needed-basis. Further, the server may also be subscribed to changes of the indicated access capability. That is to say, when the server is subscribed, the subscriber database will automatically transmit the indication to the server in response to changes of the information with respect to the indication, which stored in the database.

Figure 10:
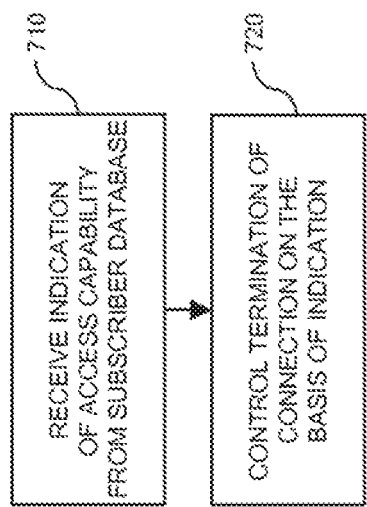
FIG. 10 shows a flowchart for illustrating a further method according to an embodiment of the invention.

FIG. 10 shows a flowchart illustrating a further method according to an embodiment of the invention. The method may be used in a mobile network with multiple access networks, e.g. in the mobile network as illustrated in FIG. 4, for controlling communication of a UE, e.g. the UE 300. More specifically, the method may be used for handling of access capability information in the application server 160 of FIGS. 4 and 7.

At step 710, an indication of an access capability of the UE in that one of the access networks which is currently used by the UE is received from a subscriber database, e.g. the subscriber database 150 of FIGS. 4 and 6. The indication may be received in response to a request message from the server, e.g. on an as-needed-basis. Further, the server may also be subscribed to changes of the indicated access capability, so as to be automatically informed when the information with respect to the indication, which stored in the database, changes. As mentioned above, the access capability may be support of voice communication over PS access, in particular support of IMS voice over PS session. The access capability may also be or include support of circuit switched fallback for short message service, support of circuit switched fallback for voice service, and/or idle mode signaling reduction being active or not.

At step 720, termination of a connection to the UE is controlled on the basis of the received indication. In particular, it may be decided whether to terminate the connection to the UE using PS access, i.e. in the PS domain, or using CS access, i.e. in the CS domain. Accordingly, if the received indication indicates support of voice communication over packet switched access, it may be decided to terminate the connection to the UE using PS access. If the received indication indicates no support of voice communication over packet switched access, it may be decided to terminate the connection to the UE using CS access, e.g. by using breakout to the CS domain.

The methods as described in connection with FIGS. 8 to 10 may be combined with each other. In particular, the method of claim 8 may be used to provide the indication as input to the method of claim 9, and/or the method of claim 9 may be used to provide the indication as input to the method of claim 10.

It is to be understood that the examples and embodiments as explained above are merely illustrative and susceptible to various modifications. For example, the concepts could be used in other types of mobile network, which are based on different types or combinations of radio access networks. Also, the concepts may be applied to handle various types of access capability information, and this information may be provided to various types of server or other network devices or functions. Further, it is to be understood that the above concepts may be implemented by using correspondingly designed software in existing network devices, or by using dedicated network device hardware. The above-mentioned technical specifications, reports, or standards are incorporated herein by reference.

What is claimed is:

1. A method of controlling communication of a user equipment in a mobile network with a plurality of access networks, the method comprising:
   controlling, by a control node, access of the user equipment to that one of the access networks which is currently used by the user equipment, wherein the control node has functionality of either or both of a Mobility Management Entity (MME) and a Serving GPRS Support Node (SGSN);
   determining, by the control node, an access capability of the user equipment in the access network currently used by the user equipment, the access capability comprising whether an IP Multimedia Subsystem (IMS) voice over Packet Switched (PS) session is supported; and
   providing, by the control node, an indication of the determined access capability to a Home Subscriber Server (HSS) associated with a subscriber using the user equipment.

2. The method of claim 1, wherein the indication is provided in response to the user equipment attaching to the mobile network or in response to the user equipment moving to said access network from another one of the access networks.

3. The method of claim 1, wherein providing the indication to the subscriber database is responsive to determining that the access capability has changed.

4. The method of claim 1, wherein the access capability further comprises one or more of:
   whether circuit switched fallback for short message service is supported;
   whether circuit switched fallback for voice service is supported;
   whether idle mode signaling reduction is active or not.

5. A method of controlling communication of a user equipment in a mobile network, implemented by a Service Centralization and Continuity Application Server (SCC AS), the method comprising:
   receiving, by the SCC AS from a Home Subscriber Server (HSS) associated with a subscriber using the user equipment, an indication of an access capability of the user equipment in that one of the access networks which is currently used by the user equipment, the access capability comprising whether an IP Multimedia Subsystem (IMS) voice over Packet Switched (PS) session is supported; and
   controlling, by the SCC AS, termination of a connection to the user equipment based on the received indication.

6. The method of claim 5, further comprising deciding, by the SCC AS, to terminate the connection based on the received indication, wherein the deciding comprises:
   deciding to terminate the connection using the IMS voice over PS session responsive to the received indication indicating support of the IMS voice over PS session; or
   deciding to terminate the connection using circuit switched access responsive to the received indication indicating no support of the IMS voice over PS session.

7. The method of claim 5, further comprising the SCC AS requesting the indication by sending a message to the HSS.

8. The method of claim 5, wherein the access capability further comprises one or more of:
   whether circuit switched fallback for short message service is supported;
   whether circuit switched fallback for voice service is supported;
   whether idle mode signaling reduction is active or not.

9. A method of controlling communication of a user equipment in a mobile network, implemented by a Home Subscriber Server (HSS) associated with a subscriber using the user equipment, the method comprising:
   receiving, by the HSS from a control node having functionality of either or both of a Mobility Management Entity (MME) and a Serving GPRS Support Node (SGSN), an indication of an access capability of the user equipment in that one of the access networks which is currently used by the user equipment, the access capability comprising whether an IP Multimedia Subsystem (IMS) voice over Packet Switched (PS) session is supported;
   storing the indication in the HSS; and
   transmitting the indication from the HSS to a Service Centralization and Continuity Application Server (SCC AS) configured to control termination of connections to the user equipment.

10. The method of claim 9, wherein the access capability further comprises one or more of:
    whether circuit switched fallback for short message service is supported;
    whether circuit switched fallback for voice service is supported;
    whether idle mode signaling reduction is active or not.

11. A control node in a mobile network with a plurality of access networks, the control node comprising:
    networking circuitry configured to exchange signals within the mobile network;

processing circuitry communicatively coupled to the networking circuitry and configured to:
- control access of a user equipment to that one of the access networks which is currently used by the user equipment;
- determine an access capability of the user equipment in said access network currently used by the user equipment, the access capability comprising whether an IP Multimedia Subsystem (IMS) voice over Packet Switched (PS) session is supported;
- transmit an indication of the determined access capability to an Home Subscriber Server (HSS) associated with a subscriber using the user equipment via the networking circuitry;
- wherein the control node has functionality of either or both of a Mobility Management Entity (MME) and a Serving GPRS Support Node (SGSN).

12. The control node of claim 11, wherein the processing circuitry is configured to transmit the indication in response to the user equipment attaching to the mobile network or in response to the user equipment moving to said access network from another one of the access networks.

13. The control node of claim 11, wherein the processing circuitry is configured to transmit the indication in response to determining that the access capability has changed.

14. The control node of claim 11, wherein the access capability further comprises one or more of:
- whether circuit switched fallback for short message service is supported;
- whether circuit switched fallback for voice service is supported;
- whether idle mode signaling reduction is active or not.

15. A Service Centralization and Continuity Application Server (SCC AS) in a mobile network, the SCC AS comprising:
- networking circuitry configured to exchange signals within the mobile network;
- processing circuitry communicatively coupled to the networking circuitry and configured to:
  - receive, from a Home Subscriber Server associated with a subscriber using the user equipment via the networking circuitry, an indication of an access capability of the user equipment in that one of the access networks which is currently used by the user equipment, the access capability comprising whether an IP Multimedia Subsystem (IMS) voice over Packet Switched (PS) session is supported;
  - control termination of a connection to the user equipment based on the received indication.

16. The SCC AS of claim 15, wherein the processing circuitry is further configured to decide to terminate the connection based on the received indication, wherein to decide the processing circuitry is configured to:
- decide to terminate the connection using IMS voice over PS session responsive to the received indication indicating support of IMS voice over PS session; or
- decide to terminate the connection using circuit switched access responsive to the received indication indicating no support of IMS voice over PS session.

17. The SCC AS of claim 15, wherein the access capability further comprises one or more of:
- whether circuit switched fallback for short message service is supported;
- whether circuit switched fallback for voice service is supported;
- whether idle mode signaling reduction is active or not.

18. A Home Subscriber Server (HSS) in a mobile network, the HSS comprising:
- networking circuitry configured to exchange signals within the mobile network;
- processing circuitry communicatively coupled to the networking circuitry and configured to:
  - receive an indication of an access capability of a user equipment from a control node having functionality of either or both of a Mobility Management Entity (MME) and a Serving GPRS Support Node (SGSN), the access capability comprising whether an IP Multimedia Subsystem (IMS) voice over Packet Switched (PS) session is supported;
  - store the indication;
  - transmit the indication, via the networking circuitry, to a Service Centralization and Continuity Application Server (SCC AS) configured to control termination of a connection to the user equipment.

19. The HSS of claim 18, wherein the access capability further comprises one or more of:
- whether circuit switched fallback for short message service is supported;
- whether circuit switched fallback for voice service is supported;
- whether idle mode signaling reduction is active or not.

* * * * *

UNITED STATES PATENT AND TRADEMARK OFFICE
CERTIFICATE OF CORRECTION

PATENT NO. : 9,674,750 B2
APPLICATION NO. : 15/224910
DATED : June 6, 2017
INVENTOR(S) : Keller et al.

It is certified that error appears in the above-identified patent and that said Letters Patent is hereby corrected as shown below:

On the Title Page

On Page 2, in Item (63), under "Related U.S. Application Data", in Column 1, Line 1, delete "13/390,161," and insert -- 13/380,161, --, therefor.

In the Drawings

In Fig. 6, Sheet 6 of 10, for Tag "158", in Line 1, delete "CAPAPILITY" and insert -- CAPABILITY --, therefor.

In Fig. 7, Sheet 7 of 10, for Tag "168", in Line 1, delete "CAPAPILITY" and insert -- CAPABILITY --, therefor.

In the Specification

In Column 1, Line 5, delete "2016," and insert -- 2016, now issued as U.S. Pat. No. 9,432,897, --, therefor.

In Column 1, Lines 43-44, delete "Multiplex (WCDMA) access." and insert -- Multiple access (WCDMA). --, therefor.

In Column 2, Line 43, delete "Update (TAU)." and insert -- Update (RAU). --, therefor.

In Column 3, Line 18, delete "CS:" and insert -- CS. --, therefor.

In Column 7, Line 36, delete "ignallin also" and insert -- also --, therefor.

In Column 7, Lines 57-58, delete "Control Function (PCRF)" and insert -- Function (PCRF) --, therefor.

Signed and Sealed this
Twenty-fourth Day of October, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,674,750 B2

In Column 7, Line 63, delete "ignallin also" and insert -- also --, therefor.

In Column 8, Line 11, delete "ignallin also" and insert -- also --, therefor.

In Column 8, Lines 22-23, delete "gateway control node 190." and insert -- gateway control node 195. --, therefor.

In Column 8, Line 26, delete "gateway node 190" and insert -- gateway node 195 --, therefor.

In Column 10, Line 34, delete "Ues" and insert -- UEs --, therefor.

In Column 11, Line 6, delete "PCC (Policy Control and Charging)." and insert -- PCC (Policy and Charging Control). --, therefor.

In Column 12, Line 2, delete "processor 116" and insert -- processor 115 --, therefor.

In Column 12, Lines 48-49, delete "processor 156" and insert -- processor 155 --, therefor.

In Column 13, Line 22, delete "processor 166" and insert -- processor 165 --, therefor.

In Column 13, Line 26, delete "capability" and insert -- capability indication --, therefor.

In Column 13, Line 61, delete "ignalling reduction" and insert -- signalling reduction --, therefor.

In Column 14, Line 34, delete "ignalling reduction" and insert -- signalling reduction --, therefor.